Patented May 23, 1933

1,910,680

UNITED STATES PATENT OFFICE

MELVIN DE GROOTE, OF ST. LOUIS, AND ARTHUR F. WIRTEL, OF WEBSTER GROVES, MISSOURI, ASSIGNORS TO TRETOLITE COMPANY, OF WEBSTER GROVES, MISSOURI, A CORPORATION OF MISSOURI

PROCESS FOR BREAKING PETROLEUM EMULSIONS

No Drawing.   Application filed March 25, 1932. Serial No. 601,294.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent or demulsifying agent used in our process consists of a sulfo-abietene acid body or a mixture that contains a sulfo-abietene acid body.

Abietene is derived from abietic acid. Abietic acid is obtained from wood rosin or colophony. Natural rosin is a solid vitreous modification of abietic acid. Various methods and procedures are employed to obtain abietic acid from rosin, and abietic acid can be treated in various ways so as to yield or produce abietene. In producing abietene commercially it is not necessary to convert rosin or like material into abietic acid and then convert the abietic acid into abietene, but as a matter of fact, abietene may be obtained directly from wood rosin by thermal decomposition. Such abietene of commerce is in a relatively pure state and contains only approximately one percent of abietic acid. Chemically, it is probable that abietene is decahydroretene.

A treating agent suitable for use in our process may be obtained by sulfonating abietene at a relatively low temperature by the use of a relatively strong sulfonating agent, such as 100% sulfuric acid. The product of the above reaction may be properly termed a sulfonic acid, although it is possible that under certain conditions it may be more akin to an acid sulfate than to a true sulfonic acid. The analogy may be somewhat similar to the reaction of propylene and sulfuric acid, in which propyl hydrogen sulfate is obtained, or even somewhat similar to a reaction in which dialkyl sulfate is formed. At times more than one sulfo group may be introduced. We consider a product or a material of the kind above referred to, when in the acid state, or after neutralization with a base, or after esterification, as coming within the term sulfo-abietene acid body, as herein used. The exact composition of said product or material is unimportant, so far as its industrial application in the present process is concerned, and we are employing the term "sulfo-abietene acids" to indicate materials obtained from abietene by means of strong sulfonating agents, including oleum and chlorosulfonic acid, without differentiating as to whether they are true sulfonic acids or acid sulfates, or of allied structure. The term "sulo-abietene acid body" is herein used in a generic sense to mean a sulfo-abietene compound of the kind previously described, in the form of an acid, or a salt or an ester—that is, the acid hydrogen may be present as such or replaced by an equivalent. The above mentioned term "sulfo-abietene acid body" does not contemplate sulfo bodies other than those described, such as abietene derivatives which might be similar to mercaptans or the like.

In practising our process we prefer to use a treating agent or a demulsifying agent obtained or produced by the following procedure: Abietene obtained by thermal decomposition and having a gravity of 0.99 at 15° centigrade, and a boiling point of about 340–350° centigrade, is sulfonated with approximately twice its volume of 100% sulfuric acid at a temperature of about 10° centigrade, and stirring continued for twenty-four hours. The sulfonated mass is then diluted so that the final concentration of sulfuric acid is approximately 38 to 42 percent, and it is allowed to stand until the upper layer, consisting of a dark, oily acidic mass, shows a clear line of separation. We will refer to this specific material produced by the above reaction or procedure as "abietene sulfonic acid".

The said dark, oily, acidic mass (abietene sufonic acid) is either used as such to constitute the treating agent of our process, or it may be neutralized prior to use, with any suitable basic material, such as caustic soda, caustic potash, sodium carbonate, potassium carbonate, ammonium carbonate, ammonium hydroxide, calcium hydroxide, magnesium carbonate, etc. If desired, abietene sulfonic acid, as above described, or a sulfo-abietene acid, may be converted into esters by conventional reaction methods with suitable alcohols, aromatic or aliphatic, and the resulting ester or esters used to constitute the treating agent of our process. Some of the esters thus obtained may be oil-soluble, and some may be water-soluble. The salts such as obtained by neutralization with inorganic bases are usually water-soluble, and a few may even be water-insoluble, as in the case of aluminum.

The specific form, state or condition of the treating agent at the time it is used or applied to the petroleum emulsion to be treated is immaterial and may be varied to suit existing conditions. It can be used in substantially anhydrous state or in solutions of any convenient strength. A concentrated solution of abietene sulfonic acid can be emulsified with oil by the agency of any suitable oil-soluble emulsifiers, such as calcium oleate and the resultant mixture used to constitute the treating agent of our process. The treating agent can be formed entirely from a material of the kind previously described, or it can be formed from such a material in combination with another or other well known treating agents for petroleum emulsions of the water-in-oil type, such as water softeners, modified fatty bodies, or their salts, petroleum sulfonic acids or their salts, or other substances known to have similar demulsifying properties.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from aproximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5000 parts of emulsion will usually be found to produce commercially satisfactory results.

What we claim as new and desire to secure by Letters Patent of the United States is:

1. A process for breaking petroleum emulsions of the water-in-oil type, which consists in subjecting the emulsion to the action of a demulsifying agent containing a sulfo-abietene acid body, selected from the class comprising acids, salts and esters.

2. A process for breaking petroleum emulsions of the water-in-oil type, which consists in subjecting the emulsion to the action of a demulsifying agent containing a salt of a sulfo-abietene acid.

3. A process for breaking petroleum emulsions of the water-in-oil type, which consists in subjecting the emulsion to the action of a demulsifying agent containing a water-soluble salt of a sulfo-abietene acid.

4. A process for breaking petroleum emulsions of the water-in-oil type, which consists in subjecting the emulsion to the action of a demulsifying agent containing the sodium salt of a sulfo-abietene acid.

5. A process for breaking petroleum emulsions of the water-in-oil type, which consists in subjecting the emulsion to the action of a demulsifying agent containing the sodium salt of abietene sulfonic acid, as herein defined.

MELVIN DE GROOTE.
ARTHUR F. WIRTEL.